March 13, 1934.   E. J. BLISS   1,951,322
FOOT MEASURING DEVICE
Filed June 10, 1932   2 Sheets-Sheet 1

Inventor
E. J. Bliss
by Leo N. Goddard
Attorney

Patented Mar. 13, 1934

1,951,322

UNITED STATES PATENT OFFICE 1,951,322

FOOT MEASURING DEVICE

Elmer J. Bliss, Boston, Mass., assignor to Regal Shoe Company, Whitman, Mass., a corporation of Massachusetts Application June 10, 1932, Serial No. 616,460

8 Claims. (Cl. 33—3)

This invention relates to foot measuring devices for use in measuring feet in shoe stores and the like for the purpose of aiding in properly fitting the feet of a customer.

I have already patented several foot measuring machines employing various arrangements of movable gauges combined with gauge adjusting devices and appropriate scales and indicators for use in shoe stores, but the object of the present invention is to provide at the lowest possible cost a device which can be supplied to public institutions and can be utilized for mail order purposes where the construction must be one that is extremely cheap to construct and yet be entirely reliable in giving correct foot measurements.

Generally speaking, the invention comprises a length measuring base member constructed to provide length measurements appropriate to any convenient number of sizes of feet, combined with a ball width measuring device so associated therewith as to give in conjunction with the appropriate length size gauges for the foot being measured the width size measurement of that foot. The embodiment of the invention illustrated in the drawings comprises, essentially, a base plate provided along its rear edge with an upstanding heel positioning gauge and along its front edge with a series of toe gauges arranged progressively, according to standard foot size measurements, to provide individual toe size measurements, to provide individual toe gauging members spaced from the heel member by consecutive size or half-size intervals, so that the length of a foot interposed between the heel gauge and the appropriate toe gauge will be readable from the length size scale associated with the toe gauges, while the width size is determined by a ball width gauging member that is slidable transversely of the base plate to be correlated with the appropriate length size toe gauge to simultaneously determine the length and width size of the foot being measured. The ball width measuring device comprises, essentially, a plate provided with lateral upturn divergent flanges located to form contact with opposite sides of the ball portion of the foot, said lateral flanges being in relatively fixed relation to each other so as to require no adjustment toward, or away from, each other, but combined with a plurality of foot gauging members removably and replaceably mounted on said lateral flanges and of known thickness corresponding to a single width size unit, whereby proper gauging contact may be established with a wide or with a narrow foot by removing or replacing these ball gauging members.

In the accompanying drawings I have illustrated a construction and arrangement of parts embodying the principles of the present invention, in which Fig. 1 is a plan view showing the complete apparatus for giving the length and width measurements of a foot being measured.

Fig. 7 is a detail view showing in rear elevation a portion of the modified form of Fig 6.

Figure 1:
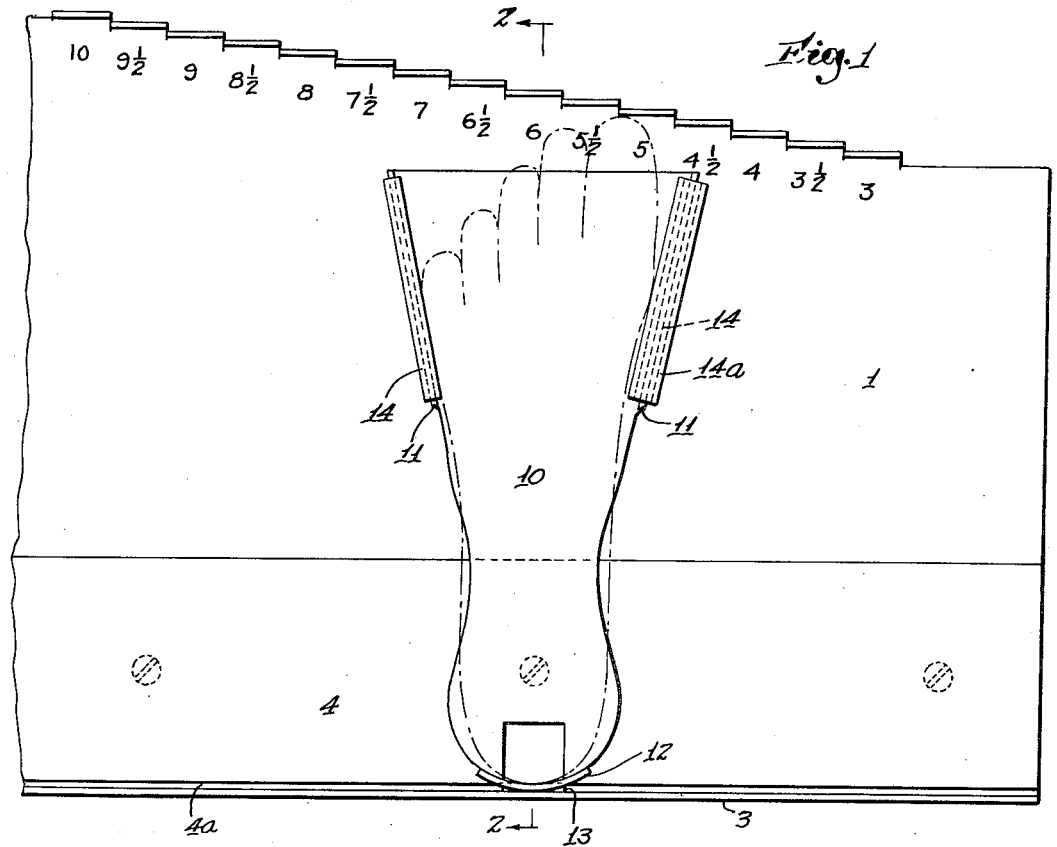

In the practice of this invention as illustrated in the drawings I provide a base plate 1, which may be made out of cheap pressed metal and which has along its rear edge an upturned flange or gauging member 3 and at its forward edge a series of toe gauging members 2 formed by bending up narrow portions of the edge, each spaced at progressively increasing distances from the heel gauge 3, the increments in length distance from such heel gauge being in this case based on ½ of the standard length size increments in foot measuring and shoe making. Since an increase of a single length size in foot measuring is equal to ⅓ inch, the half-size would be equal to ⅙ inch, so that each of the series of stepped toe gauges beginning at the short end would be located ⅙ inch farther from the heel gauge in the series and appropriate length size numerals will be placed opposite to, or on, the individual toe gauges to permit the correct reading of the length size measurement of a foot when the back of the heel is properly gauged at the rear and the toe barely or nearly grazes one of the individual toe gauges.

Figure 2:
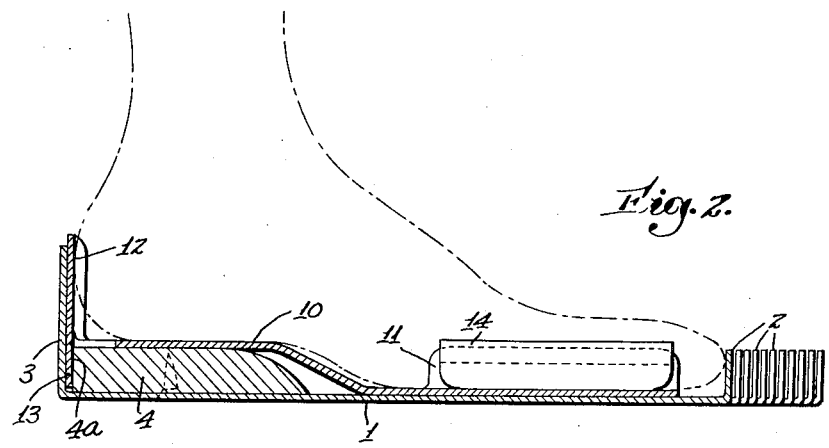
Fig. 2 is a longitudinal section of the device shown in Fig. 1 on sectional line 2—2 of Fig. 1.
Figure 3:
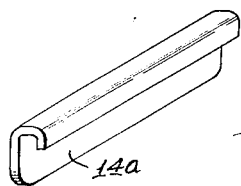
Fig. 3 is a detail perspective view of one of the removable gauging members.
Figure 4:
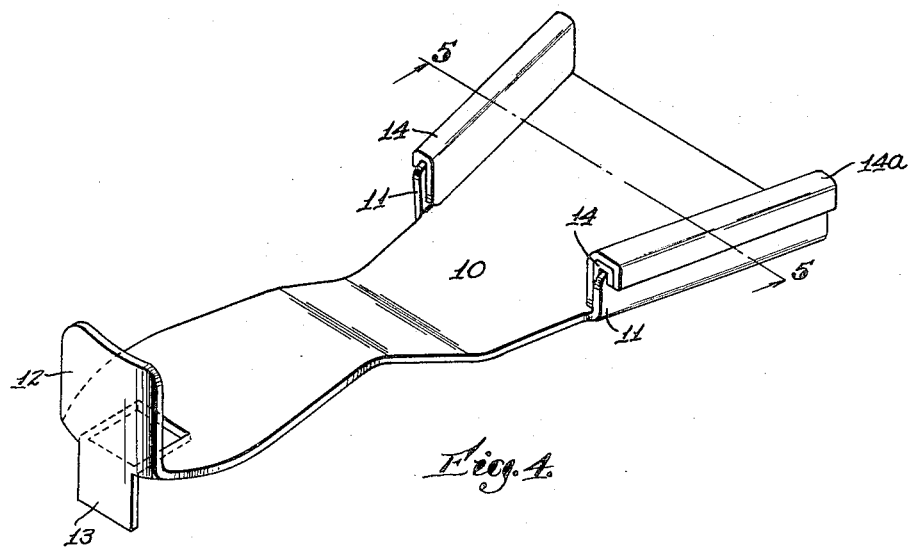
Fig. 4 is a perspective view of the ball measuring gauge showing the removable width size gauging members.

Since the bony frame of the foot expands when supporting the weight of the person, it is desirable that the weight should be thrown slightly forward as in walking. Consequently, a raised heel support 4 is provided to give this posture to the foot when measuring. This raised heel support may be ready made of a strip of wood, or other suitable material, fastened to the rear portion of the base plate 1. As shown in Fig. 1 and Fig. 2 of the drawings, a crack or groove is left between the heel raising block 4 and the upturned heel positioning flange or gauge member 3 for a purpose presently to be described.

Now, as is well known to those skilled in the art of shoe making or foot measuring, width size measurement symbols according to recognized standards, vary in actual width dimensions according to the length measurement of the foot. A number 7 foot always means under standard practice the same length of foot, but the width size measurements are designated by letters A, B, C, D, E et cetera, but the actual width indicated in such width size measurements depends altogether upon the length of the foot. For example, if two feet or two shoes, respectively, are designated as number 7—C and number 8—C, the number 8 foot will be 1/3 of an inch longer, that is, one length size longer than the number 7 foot, but the C width in a number 8 foot indicates one width size (1/12 inch) greater than does the designation number 7—C, so that a number 7—C width in actual ball width measurement is the same as a number 6—D width or a number 8—B width. From this it follows that the device for measuring the ball width of a foot must always be correlated with the correct length measurement of the foot, that is, for each full size increment in length measurement a foot having the same relative or proportionate width size measurement would increase the ball width by 1/12 of an inch.

Generally speaking, in standard practice the ball length, that is, the distance from the point of heel gauging contact to the high point of the ball joint on the inside of the foot, would be 2/3 of the over-all length of the foot. Consequently, as the ball length is 2/3 of the over-all length, for each size length increase in the over-all length, there will be a corresponding increase or increment of the ball length measurement of 2/9 inch. Therefore, the lateral ball gauging members should diverge in a similar ratio, that is, for each ball length size unit of 2/9 inch the transverse distance between the side gauges should increase 1/12 inch.

Figure 5:
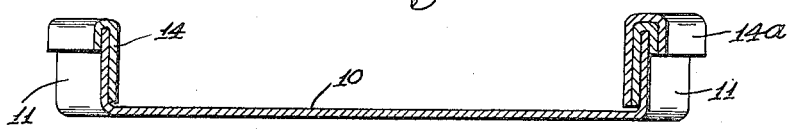
Fig. 5 is a transverse section on the sectional line 5—5 of Fig. 4.
Figure 3:
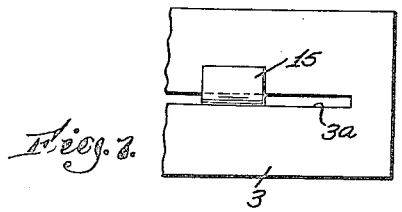

Now, suppose that the fixed divergent ball guaging members laid out on the plan above described are spaced at any given size length to give a transverse spacing between the gauges corresponding to the widest or E width. Then it is clear that as these ball gauge members are in fixed relation the device could only properly gauge a foot that measures 7—E or 8—E, or any other length size of E width. Accordingly, I have provided a series of width gauging or spacing elements in the form of vertical plates bent outwardly and downwardly to be removably mounted upon the divergent fixed lateral flanges 11, that form the ball width gauges appropriate for an E width of foot. Each one of the spacing ball gauging members 14 are made 1/2 inch thick. Consequently, if one of these ball gauging spacers is placed on each fixed ball gauge 11, the gauging space will be reduced two width sizes, thus indicating a C width of foot that is properly in gauging contact with both said members at the ball. To still further diminish the width space additional gauging member 14a, formed to be placed upon the initial gauging spacers 14, are provided so that when three spacers are applied, as shown in Fig. 5, to form gauging contact against the ball of an inserted foot being measured, the width size indicated would be a B width, while the addition of a fourth spacer member, in order to secure proper gauging contact with the foot being measured, would indicate an A width size.

The ball width measuring element in its simplest form comprises a plate or sheet 10, whose rear end is bent upwardly to gauge the heel and whose forward end is provided with the divergent, preferably integrally formed, ball width gauge members 11 which diverge on the scale already explained and which serve as supports for the ball width spacing gauges 14, 14a as above described. At the rear end of the plate a lug or flange 13 is struck out from the bottom to form a vertical continuation of the heel gauge 12, which lug or flange 13 is insertable in the groove or channel between the upturned flange 3 and the raised heel block 4. As shown in Fig. 2, the heel portion of the plate 10 is offset vertically to rest on the heel raising block 4. The downwardly extending flange 13 forms a guide slidable along the channel 4a, thus permitting the ball width measuring element to be shifted or slid laterally along the base plate 1 to proper position to gauge the toe of the foot being measured against the appropriate length size measuring member 2.

In Fig. 1 is shown the dotted outline of a foot being measured with the toe lightly grazing the toe gauge for number 5 length size and with three spacers carried by the side gauges, so that the foot size measurement indicated in that Figure is 5—B.

The width size gauge by the tongue and groove engagement 13, 4a is kept in proper gauging position and provides the proper posturing of the foot to allow for the normal expansion of the foot when supporting the weight. If the size measurement of the foot is already known, the ball width measuring device may be used separately to ascertain the ball width of any foot of known length size.

Figure 6:
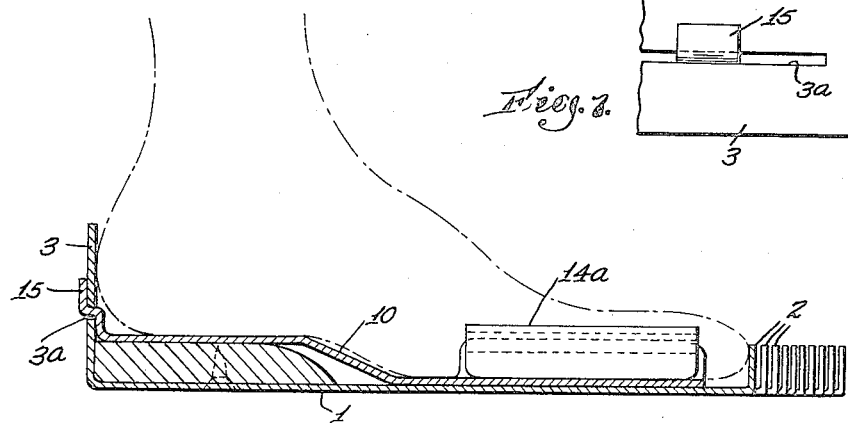
Fig. 6 is a longitudinal section of a slightly modified form of apparatus.

The modified construction shown in Fig. 6 and in Fig. 7 is in all respects similar to the form already described, except in respect to the provision for securing sliding engagement between the length size measuring element and the ball width element. In this case the upturned flange 3 is provided with a slot 3a, while the rear end of the plate 10 is bent angularly to form an offset tongue 15 which can be inserted in the guide slot 3a by presenting the plate 10 in a nearly vertical position for the insertion of the offset member 15, following which the plate may be dropped to horizontal position for use so that longitudinal displacement of the width gauge in relation to the flange 3 is prevented, while allowing the width measuring element to be slid along to bring the foot to proper toe gauging position, as previously described.

Since the length size measuring element forming part of the combination can be stamped out of a single piece of sheet metal requiring only the attachment of a heel raising block 4, it is obvious that this part of the device can be produced at extremely low cost. Furthermore, since the width measuring element can similarly be died out from a single piece of sheet metal that also is very cheap to make. The spacers 14 and 14a likewise can be made of pressed metal, so that a device is provided of the cheapest possible construction and yet it provides an absolutely reliable and accurate foot measuring device for determining the length and width measurements of any foot in expanded posture while supporting the weight, which is the correct method of determining foot size measurement for the purpose of fitting shoes.

What I claim is:

1. A foot measuring device embracing a foot supporting base provided at its rear with an upwardly projecting heel gauging member and at its forward edge with upwardly turned toe gauging members progressively spaced at different distances from the heel gauge corresponding to successive foot length measurements in accordance with the length size indicia marked thereon, and a width measuring and foot positioning device on said base slidable transversely of its own length and comprising a plate provided with upturned lateral divergent ball gauging members for engaging opposite sides of the ball portion of the foot and spaced apart to give known width-size measurements when correlated with the appropriate member for gauging the toe of the foot being measured.

2. A foot measuring device embracing a foot supporting base provided at its rear with an upwardly projecting heel gauging member and at its forward edge with upwardly turned toe gauging members progressively spaced at different distances from the heel gauge corresponding to successive foot length measurements in accordance with the length size indicia marked thereon, a heel elevating and supporting member for raising the heel portion of the foot, and a width measuring and foot positioning device slidable transversely of its length comprising a plate provided with upturned lateral divergent ball gauging members for engaging opposite sides of the ball portion of the foot and spaced apart to give known width-size measurements when correlated with the appropriate member for gauging the toe of the foot being measured.

3. A foot measuring device embracing a base plate, an upturned heel gauging member arranged along the rear edge thereof, a heel elevating block secured to the rear portion of said base plate and separated from said upwardly projecting heel gauge by a spacing channel, a series of toe gauging members projecting upwardly from the front edge of the base plate and located at different foot size distances from the heel gauge combined with a width gauging and foot positioning member slidable along the series of toe gauging members provided with a guide at its rear projecting into said channel to be slidable therein and having at its forepart upturned side gauging members forwardly diverging in accordance with the ratio of ball length size increments to width size increments, and removable spacing members carried by said side gauges to project down inside said gauges and decrease the width of the intervening space by a predetermined increment of width measurement.

4. A foot measuring device embracing in its construction a base plate provided at its rear edge with an upturned heel gauging member and provided at its forward edge with a series of toe gauging members differently spaced from the heel gauging member in accordance with length size scale measurements, and a width size gauge slidable along said series of toe gauging members and having divergent upturned side members for gauging the width of the foot when said width gauging member is positioned to present the toe of an interposed foot against the appropriate length measuring gauge member.

5. A foot measuring device embracing in its construction a base plate provided with an upwardly projecting heel gauging member at its rear end and provided with a series of differently spaced toe gauging members arranged at intervals along its forward edge, a width measuring element comprising a bottom plate having tongue and slot engagement at its rear with the base plate to permit lateral adjustment of the width gauge along the series of toe gauging members to bring it into proper registry with the individual toe gauge member appropriate to the foot being measured and having also at its forepart lateral divergent side gauging members adapted to form gauging contact with a foot of predetermined width, and removable spacers mounted on said side gauging members to vary the width spacing according to the predetermined thickness of the spacers.

6. A width size measuring device for determining the appropirate width size of a foot of known length embracing in its construction a bottom plate provided at its rear with an upwardly projecting heel gauging member and having on opposite sides of its forepart two upturned forwardly divergent ball gauging members spaced a predetermined distance apart to form gauging contact with feet of different length measurements having a predetermined width size, and spacing members removably mounted on said ball gauging members and projecting downward inside thereof to form gauging contact with feet of less than the predetermined width size in order to ascertain the width measurement of such feet.

7. A width size gauge for measuring feet of known size length embracing in its construction a bottom plate provided at its rear with an upturned heel gauging member and at its forepart with divergent upturned flanges for gauging feet of predetermined width size and different lengths, spacing members for gauging feet of narrower width than said predetermined size and comprising angle plates having an inner and vertical member having the thickness of a single width size unit of measurement and having a hook-line suspension member at its top for removably supporting it upon either divergent side gauge.

8. A foot measuring device embracing in combination a foot positioning and width measuring device comprising a foot supporting plate having at its rear a heel gauging stop and having forwardly disposed divergent upturned side members for engaging opposite sides of the ball portion of an interposed foot positioned against said heel stop, and a toe gauging member having a series of offset upturned toe gauging members spaced at different distances from the line of the heel stop, the width measuring and the toe gauging members having sliding engagement with each other to permit movement of one in relation to the other transversely of the length of the foot being measured to establish gauging relation between the toe of the foot and the appropriate toe gauging member of said series.

ELMER J. BLISS.